United States Patent
Brune et al.

(10) Patent No.: US 6,532,663 B2
(45) Date of Patent: Mar. 18, 2003

(54) CELLULAR HYDROSTATIC FLUID BEARING, AND A METHOD OF MAKING IT

(75) Inventors: Claude Brune, Vernon (FR); Patrice Fayolle, Vernon (FR); Régis Moello, La Villeneuve-en-Chevre (FR); Gilles Frechon, Val David (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/873,600

(22) Filed: Jun. 4, 2001

(65) Prior Publication Data

US 2001/0048777 A1 Dec. 6, 2001

(30) Foreign Application Priority Data

Jun. 6, 2000 (FR) .............................. 00 07208

(51) Int. Cl.⁷ ................................ B21K 1/10
(52) U.S. Cl. ....................... 29/898.02; 29/898.047; 29/898.056; 29/898.059; 29/898.07; 384/111; 384/118
(58) Field of Search .................. 29/898.02, 898.047, 29/898.054, 898.055, 898.056, 898.057, 898.058, 898.059, 898.07, 898.09; 384/100, 101, 111, 112, 118

(56) References Cited

U.S. PATENT DOCUMENTS

| | | | |
|---|---|---|---|
| 1,597,428 A | * | 8/1926 | Brincil |
| 2,364,290 A | * | 12/1944 | Hanson |
| 3,134,336 A | * | 5/1964 | Huffman et al. |
| 3,359,613 A | * | 12/1967 | Rye |
| 3,545,248 A | * | 12/1970 | Whiteside |
| 3,552,807 A | | 1/1971 | Blount .................. 308/9 |
| 3,909,087 A | * | 9/1975 | Cairns |
| 4,292,718 A | * | 10/1981 | Iijima |
| 4,618,270 A | | 10/1986 | Kraus .................. 384/119 |
| 4,671,676 A | * | 6/1987 | Chen et al. |
| 4,710,035 A | * | 12/1987 | Vaugh |
| 5,106,204 A | | 4/1992 | Dunham ............... 384/12 |
| 5,153,991 A | * | 10/1992 | Dickson et al. |
| 5,192,136 A | | 3/1993 | Thompson et al. ..... 384/123 |
| 5,199,170 A | * | 4/1993 | Mori et al. |
| 5,281,032 A | * | 1/1994 | Slocum |
| 5,885,004 A | | 3/1999 | Scharrer et al. ....... 384/99 |
| 6,007,311 A | * | 12/1999 | Cygnor et al. |
| 6,056,441 A | * | 5/2000 | Scharrer et al. |
| 6,071,013 A | * | 6/2000 | Inaguma et al. |
| 6,095,690 A | * | 8/2000 | Niegel et al. |

FOREIGN PATENT DOCUMENTS

| | | |
|---|---|---|
| DE | 34 16 833 | 11/1985 |
| GB | 1181063 | 2/1970 |
| JP | 59043221 | 3/1984 |

* cited by examiner

Primary Examiner—Gregory M. Vidovich
Assistant Examiner—Eric Compton
(74) Attorney, Agent, or Firm—Weingarten, Schurgin, Gagnebin & Lebovici LLP

(57) ABSTRACT

The hydrostatic fluid bearing comprises a cylindrical stator having orifices for introducing a fluid under pressure, on its inside surface the stator has a split ring constituted by an assembly comprising a plane metal plate and a layer of self-lubricating composite material. The layer of composite material has cells for surrounding orifices for introducing fluid under pressure, once the assembly has been put into place inside the stator.

8 Claims, 2 Drawing Sheets

CELLULAR HYDROSTATIC FLUID BEARING, AND A METHOD OF MAKING IT

FIELD OF THE INVENTION

The present invention relates to the field of cellular hydrostatic fluid bearings for supporting rotary shafts, in particular in rocket engine turbopumps for pressurizing fluid.

PRIOR ART

Cellular hydrostatic fluid bearings are in widespread use in numerous industrial applications, in particular where high loads are involved or which require high speed, or great precision, or long lifetime. Nevertheless, they are still relatively little used in rocket engine turbopumps.

FIG. 4 shows the structure of a conventional hydrostatic bearing 40 comprising an annular bearing stator 41 in which a rotor 42 constituting the shaft of a turbopump is received. When the turbopump is in operation, the rotor 42 is held in suspension by a thin layer of fluid introduced under pressure through orifices 44 in cells 43 of the bearing stator 41. The cells 43 are machined directly in the material of the stator 41. Since the inside surface of the stator is cylindrical, it is quite difficult to machine such cells. Machining is particularly difficult when the diameter of the stator is small.

An auxiliary tank for pressurizing fluid to keep the shaft in levitation from the first instants can be used during transient stages so as to avoid any shaft-bearing contacts that could damage the pump drive system. Such an auxiliary device contributes to making the pump apparatus as a whole heavier and increases the risk of failure. Thus, in rocket engine turbopumps, the pressure used for introducing fluid into the bearing stator is usually taken directly from the outlet of the pump. Consequently, during a portion of the transient stages (starting, stopping, . . . ) that occur during the operation of such pumps, the fluid pressure feed to the bearings as taken from the outlet of the pump is not yet or is no longer at a level which is sufficient to ensure that the rotor is levitated.

In order to reduce the risk of failure during shaft-bearing contacts, the inside surface of the stator can be subjected to special surface treatment or a thin lubricating layer can be deposited thereon. Unfortunately, such treatment of the inside surface of the bearing presents various difficulties, in particular concerning the thickness of such a coating layer, which thickness is generally less than 50 micrometers ($\mu$m), and also concerning its uniformity.

The small thicknesses contained do not make it possible to accommodate a large number of transient stages without damaging the shaft and the bearings.

OBJECT AND BRIEF DESCRIPTION OF THE INVENTION

The present invention seeks to remedy the above-mentioned drawbacks and to provide a cellular hydrostatic fluid bearing in more convenient manner and minimizing the risks of failure in the event of shaft-bearing contacts.

These objects are achieved by a hydrostatic fluid bearing comprising a cylindrical stator having orifices for introducing fluid under pressure, wherein said stator has on its inside surface a ring constituted by an assembly of a metal plate including orifices which co-operate with the orifices for introducing fluid and of a layer of self-lubricating composite material which includes cells disposed around said orifices.

Thus, the fluid bearing of the invention presents a thickness of a layer of composite material on its inside surface that can accommodate a large amount of wear therein without running the risk of irremediable damage to the shaft or the bearing in the event of shaft-bearing contacts, which also makes it possible to pass through transient stages without auxiliary means for providing pressure.

More particularly, the ring is an open ring held in compression inside the stator.

Specifically, the thickness of the layer of composite material is greater than 50 $\mu$m and less than 2 millimeters (mm).

The invention also provides a method of manufacturing a cellular hydrostatic fluid bearing, the method comprising the following steps: assembling a layer of self-lubricating composite material on a surface of a plane metal plate; cutting the assembly comprising the metal plate and the composite material to dimensions that correspond to the development of an inside surface of a stator; machining cells in the thickness of the layer of composite material of said assembly; curving said assembly to form a split ring; inserting said assembly in the form of a split ring against the inside surface of the stator; and machining orifices through the thickness of the stator and through said cells of the inserted assembly.

The method of the invention for manufacturing a hydrostatic bearing thus makes it possible to make the inner portion of the stator that is to receive a rotary shaft from a plane metal structure that enables a thick layer of self-lubricating composite material to be formed and that makes it easier to machine the cells.

More specifically, the thickness of the layer of composite material is greater than 50 $\mu$m and less than 2 mm.

In a particular aspect of the invention, the step in which said assembly is inserted as an interference fit is performed either by means of a press, or by thermally expanding the stator, or by thermally shrinking the ring-shaped assembly, or indeed by a combination of two or three of these techniques.

In another aspect of the invention, the method of manufacture further comprises a final step of re-boring the inside surface of the stator in the composite material.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF EMBODIMENTS OF THE INVENTION

Figure 3:
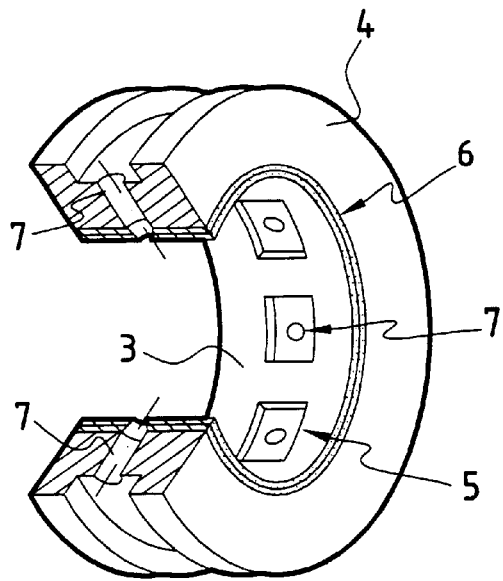
FIG. 3 is a diagrammatic truncated perspective view of a hydrostatic fluid bearing constituting an embodiment of the invention.
Figure 4:
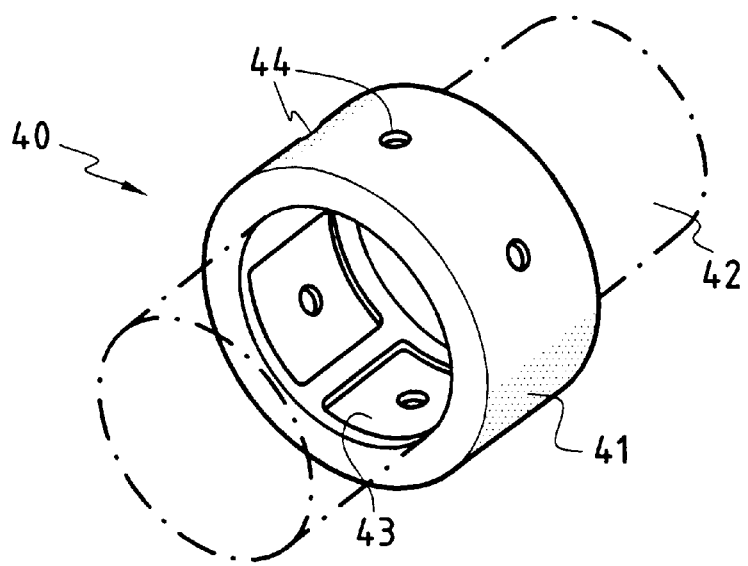
FIG. 4 is a perspective view of a prior art hydrostatic fluid bearing.

FIG. 3 shows a hydrostatic fluid bearing constituting an embodiment of the invention. The bearing of the invention comprises a solid stator 4 of cylindrical shape having a split ring 6 on its inside surface which is held in place by compression inside the stator 4. The ring 6 has a first thickness constituted by a metal plate 2 which is in contact with the inside surface of the stator 4, and a second thickness formed by a layer of self-lubricating composite material 3 which defines the inside surface of the bearing that is to support and levitate a rotary shaft (not shown). The layer of composite material 3 has cells 5 at regular intervals over the inside surface of the bearing. Each cell 5 presents an orifice 7 which passes through the thickness of the stator 4 and the metal plate 2. The orifices 7 enable the cells 5 of the bearing to be fed with fluid under pressure to provide the mechanism for levitating the rotary shaft that is specific to hydrostatic bearings.

The hydrostatic bearing of the invention includes on its inside surface, between the cells, a composite material of thickness that can be as great as 1 mm, which is a large value compared with the thicknesses of lubricating film coatings obtained in the prior art by specific treatment of the inside surfaces of bearing stators. Thus, because of the significant amount of lubricating composite material that is available, the bearing of the invention can accommodate numerous fitting operations such as final re-boring, or re-alignment of bearings such as pairing or aligning bearings in pairs.

Still because of the significant thickness of composite material present on the inside surface of the bearing of the invention, the transient stages when starting or stopping turbopumps, and in particular cryogenic turbopumps, are made easier because of increased tolerance to shaft-bearing contacts, and this also makes it possible for such bearings to withstand breakdowns because of their endurance in the face of such contacts.

The method of manufacturing a hydrostatic fluid bearing of the present invention is described with reference to FIGS. 1 to 3 which show the various appearances of the component elements of the bearing of the invention during its manufacturing steps.

Figure 1:
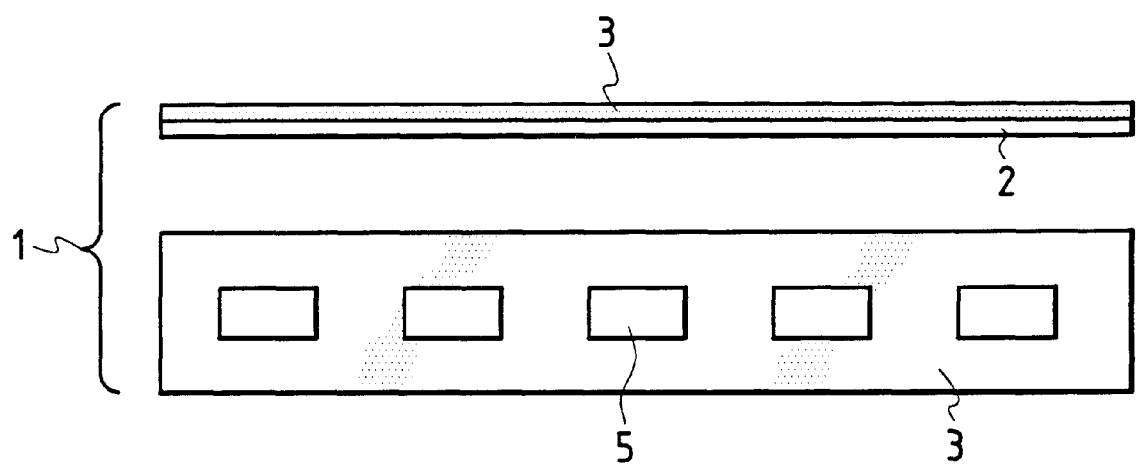
FIG. 1 is a diagrammatic view showing an assembly for a bearing in an embodiment of the invention.

FIG. 1 shows the first three manufacturing steps for a bearing of the invention, which steps consist firstly in making an assembly 1 from a plane metal plate 2 having a layer of self-lubricating composite material 3 formed thereon. The assembly 1 formed in this way is then cut to dimensions which correspond to the development of the inside surface of the bearing stator 4 (FIG. 3) in which it is to be inserted at the end of the manufacturing method of the invention. Thereafter, cells 5 are machined by milling or some other technique, solely through the thickness of the layer of composite material 3.

Unlike prior art hydrostatic fluid bearings in which the cells are machined directly in the inside surface of the cylindrical stator, after which the thin lubricating coating can then be deposited, the invention proposes performing these steps on the assembly structure 1 while it is plane. This makes it possible to achieve more accurate control in terms of thickness and uniformity over the layer of self-lubricating composite material. The method of the invention makes it possible to incorporate a uniform layer of self-lubricating composite material of thickness that is large, up to about 1 mm, inside the bearing stator, unlike solutions involving surface treatment or depositing a thin coating. In addition, because the assembly 1 is plane in shape during the early steps of manufacturing the bearing of the invention, the cells are easier to machine, in particular for bearings having a bore of small diameter (diameter less than 45 mm) since this operation is now performed on a plane plate.

Figure 2:
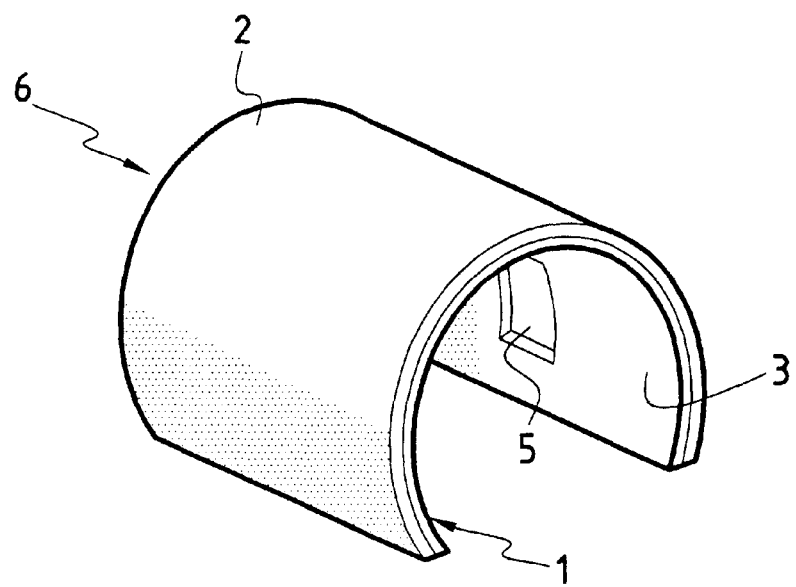
FIG. 2 is a truncated diagrammatic perspective view showing an assembly that has been shaped in accordance with the invention.

FIG. 2 shows the assembly 1 after a step of shaping the assembly which consists in curving it so as to convert it from a flat shape as shown in FIG. 1 to the shape of an open split ring 6 as shown in FIG. 2. When the assembly is in the form of an open split ring as shown in FIG. 2, it is substantially cylindrical in shape having an outside surface constituted by the metal plate 2 and an inside surface defined by the layer of composite material 3 which includes the cells 5.

FIG. 3 shows the final structure of the bearing stator as obtained by the method of the present invention. In this last step of forming the bearing of the invention, the solid stator 4 receives against its inside surface the split ring 6 constituted by the curved assembly 1 so that the outside surface of the ring 6 formed by the metal plate 2 comes to bear against the inside surface of the stator. The split ring 6 whose rest size is greater than the diameter of the bearing stator 4 is inserted into the stator either by means of a press, or by thermally expanding the stator, or by thermally shrinking the split ring 6, or by a combination of two or three of these techniques.

Thus, the layer of self-lubricating composite material 3 now constitutes the inside surface of the stator which then presents a self-lubricating coating of significant thickness and including cells. Orifices 7 enabling the cells 5 to be fed and ensuring that the compensation phenomenon specific to hydrostatic bearings can take place are machined by drilling through the bearing stator 4 and the split ring 6 so as to open out into the cells 5 of the layer of composite material 3.

The method of manufacturing a hydrostatic bearing of the invention can also include a final operation of re-boring the inside surface of the stator 4 in its layer of composite material 3 so as to enable two bearings to be paired or so as to bring them into alignment.

What is claimed is:

1. A method of manufacturing a cellular hydrostatic fluid bearing, the method comprising the following steps:
    a) assembling a layer of self-lubricating composite material on a surface of a plane metal plate;
    b) cutting the assembly comprising the metal plate and the composite material to dimensions that correspond to the development of an inside surface of a stator;
    c) machining cells in the thickness of the layer of composite material of said assembly;
    d) curving said assembly to form a split ring;
    e) inserting said assembly in the form of a split ring against the inside surface of the stator; and
    f) machining orifices through the thickness of the stator and through said cells of the inserted assembly.

2. A method of manufacture according to claim 1, wherein the thickness of said layer of composite material is greater than 50 µm.

3. A method of manufacture according to claim 1, wherein the thickness of said layer of composite material lies in the range 50 µm to 2 mm.

4. A method of manufacture according to claim 1, wherein step e) in which said assembly is inserted as an interference fit is performed by means of a press.

5. A method of manufacture according to claim 1, wherein step e) in which said assembly is inserted as an interference fit is performed by thermally expanding the stator.

6. A method of manufacture according to claim 1, wherein step e) in which said assembly is inserted as an interference fit is performed by thermally shrinking the ring-shaped assembly.

7. A method of manufacture according to claim 1, wherein step e) is performed by a combination of the following actions: pressing; thermal expansion of the stator; and thermal shrinking of said assembly.

8. A method of manufacture according to claim 1, the method further comprising a final step of re-boring the inside surface of the stator in the composite material.

* * * * *